United States Patent
Foley

(10) Patent No.: US 9,004,011 B2
(45) Date of Patent: Apr. 14, 2015

(54) WEIGHTED SUPPORT FOR A PET CHEW ARTICLE

(71) Applicant: Mary Foley, River Falls, WI (US)

(72) Inventor: Mary Foley, River Falls, WI (US)

(*) Notice: Subject to any disclaimer, the term of this patent is extended or adjusted under 35 U.S.C. 154(b) by 0 days.

(21) Appl. No.: 13/772,877

(22) Filed: Feb. 21, 2013

(65) Prior Publication Data
US 2013/0255592 A1 Oct. 3, 2013

Related U.S. Application Data

(60) Provisional application No. 61/619,165, filed on Apr. 2, 2012.

(51) Int. Cl.
| | |
|---|---|
| A01K 29/00 | (2006.01) |
| A01K 11/00 | (2006.01) |
| A01K 15/02 | (2006.01) |

(52) U.S. Cl.
CPC .............. *A01K 15/026* (2013.01); *A01K 15/025* (2013.01); *Y10S 248/91* (2013.01)

(58) Field of Classification Search
CPC ................................................... A01K 15/025
USPC ................ 119/709, 707, 702, 708, 710, 711, 119/51.01, 51.03; 248/910
See application file for complete search history.

(56) References Cited

U.S. PATENT DOCUMENTS

| | | | | |
|---|---|---|---|---|
| 4,930,448 | A * | 6/1990 | Robinson ....................... | 119/708 |
| 5,415,132 | A * | 5/1995 | Meyer ............................ | 119/707 |
| 5,560,319 | A * | 10/1996 | Rising ............................ | 119/709 |
| 5,634,436 | A * | 6/1997 | Coombs et al. ................ | 119/707 |
| 6,536,376 | B2 * | 3/2003 | Brown ........................... | 119/769 |
| 6,578,528 | B1 * | 6/2003 | Brown ........................... | 119/769 |
| 6,672,253 | B1 | 1/2004 | Viola | |
| 6,892,675 | B1 * | 5/2005 | Comerford .................... | 119/708 |
| 8,047,217 | B1 * | 11/2011 | Schermerhorn, Jr. .......... | 135/118 |
| 2003/0172879 | A1 * | 9/2003 | Bader ............................. | 119/709 |
| 2003/0205206 | A1 | 11/2003 | Natale | |
| 2006/0185617 | A1 * | 8/2006 | Kenny ........................... | 119/707 |
| 2009/0025649 | A1 | 1/2009 | Gamble | |
| 2009/0217885 | A1 | 9/2009 | Peter | |
| 2010/0199925 | A1 * | 8/2010 | Lee ................................ | 119/708 |
| 2013/0277526 | A1 * | 10/2013 | Wendling .................. | 248/346.03 |

* cited by examiner

*Primary Examiner* — Kristen C Hayes
(74) *Attorney, Agent, or Firm* — Daniel Boudwin; Global Intellectual Property Agency LLC

(57) ABSTRACT

A weighted pet chew article support device is provided having a weighted structure that is designed to keep a pet within a given area while consuming or gnawing on the treat or chew toy. The device comprises a weighted member having sidewalls, a base, and an upper surface that supports a treat attachment strap. The strap wraps around a pet treat and includes a length of elastomeric material therein to prevent the treat from sliding while grasped by the strap. The base of the weighted member may comprise a non-sliding surface for use on slick floors. The weighted member itself is a resilient sack of lined material that can be readily repaired if the pet gnaws thereon. Further provided is a multi-treat attachment system that includes a plurality of elongated members attaching to the uppermost strap for securing more than one treat therewith.

17 Claims, 3 Drawing Sheets

WEIGHTED SUPPORT FOR A PET CHEW ARTICLE

CROSS REFERENCE TO RELATED APPLICATION

This application claims the benefit of U.S. Provisional Application No. 61/619,165 filed on Apr. 2, 2012, entitled "Bone Bag." The above identified patent application is herein incorporated by reference in its entirety to provide continuity of disclosure.

BACKGROUND OF THE INVENTION

1. Field of the Invention

The present invention relates to pet treat supports and weighted supports. More specifically, the present invention pertains to a weighted support for a pet treat, whereby at least one treat or chew toy article is supported along a surface in stationary position for at least one pet to consume the article therefrom.

Many domestic pets enjoy chew toys and other tough treats that require long-term chewing and gnawing in order to completely consume or gain access to the consumable portion thereof. The chewing provides an activity for the pet that allows the pet to direct its energy toward the given toy or treat, displacing boredom and preventing the pet from otherwise chewing on household items like shoes and furniture. For most pets, the chewing and gnawing activity is both soothing and therapeutic, as the pet can entertain itself while it wears down the article exterior to gain access to the article interior, which is generally a consumable product. Chew toys such as bones, rawhide, and rubberized articles provide a means to support an interior quantity of food for the pet or have an inherently tough exterior that requires extensive gnawing to consume. The act of chewing gnawing relieves anxiety for the pet, provides a source of entertainment, and keeps the pet occupied for extended periods of time.

Certain pets must be monitored during these chewing activities to ensure the pet does not choke on the chewing article, and to make sure the pet does not hide a partially eaten article within the house or bury it outside. If the pet likes to chew in seclusion, the pet may run away with the article and make the ability of an owner to watch the chewing activity quite difficult. Holding the article while the animal is chewing another end is not a feasible option, as the pet will likely pry it away from its owner or even injure the owner by accidentally biting or scraping his or her fingers.

To address this known issue in the art, the present invention provides a weighted pet chew article support that includes a means to secure at least one chew article thereto and prevent the pet from readily relocating the article. The device comprises a weighted structure having a strap means for connecting to a bone or chew toy. A multiple strap harness is also disclosed for simultaneously securing a plurality of treats to the structure for use by multiple pets. The structure itself is a resilient bag comprised of a repairable construction that surrounds a quantity of high density material to give weight to the device. Below the weighted bag may include a high friction base that prevents sliding along wood and other slick indoor surfaces while deployed. Overall it is desired to provide a chewable article support and weighted base for an animal, and particularly a dog, to enjoy the article in place.

2. Description of the Prior Art

Devices have been disclosed in the prior art that relate to pet chew toy supports. These include devices that have been patented and published in patent application publications, and generally relate to weighted articles having mechanical connectors to an elevated chew toy for a pet to consume or chew. The following is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 6,672,253 to Viola discloses a flying disk toy having a rope attachment for recreational use with a pet. The device comprises a gyroflier disk toy having a rope secured therethrough and tied into a knot at both ends for the pet to chew and grasp the assembly. The circular gyroflier can be thrown for the pet to chase, or the pet can use the knots as chew toys for singular enjoyment. The device, while providing a chew toy for a pet, does not pertain to the main object of the present invention, notably the use of a weighted support for maintaining the position of a supported treat while a pet consumes the treat in place. The structure and the intent of the Viola device diverge from that of the present invention.

U.S. Patent Application Publication No. 2003/0172879 to Bader discloses a chew toy holding apparatus comprising a base platform and an adjustable attachment for a pet chew toy that allows the assembly to grasp and position a chew toy in relationship to the base. The attachment can swivel and pivot to position the chew toy in the most advantageous position for the pet to chew a toy or consume an edible chew article such as a bone. While demonstrating a similar purpose and intent as compared to the present invention, the present invention discloses a non-mechanical attachment to a pet toy or treat, while also offering the capability to support multiple toys at once for more than one pet to enjoy.

U.S. Patent Application Publication No. 2003/0205206 to Natale discloses a dog bone or chew toy holder having a weighted base and a vertically disposed rod for securing the bone or toy to the distal end thereof. The rod end includes a threaded connection while the toy or bone includes a tapped hole for securing the two articles together. The base is a cylindrical structure having a concrete filler material, maintaining the position of the base while the toy or bone is engaged by the pet. In a similar fashion as the Bader device, the Natale device describes a pet toy or treat holder having a mechanical connection to the pet article. The present invention provides a treat support device having similar purpose; however the elements of present invention diverge from that of the Natale device.

Finally, U.S. Patent Application Publication No. 2009/0217885 to Peter discloses a pet treat holder device that comprises a first and second member that clamp together about a pet treat and support the treat therebetween. The members include a coupling therebetween to draw the member together around the pet treat, while one of the members includes a cavity or recess to receive a portion of the treat to improve the grip of the clamp thereof and reduce the clamp member distance when engaging the coupling therebetween. The Peter device discloses a bone or pet treat clamp that is adapted to hold the treat to facilitate access to the consumable portions thereto and prevent ingestion of wrapping or non-ingestible portions thereof by the pet. The present invention pertains to a weighted base for supporting at least one pet treat, wherein several embodiments are disclosed for supporting at least one treat and maintaining its position as the pet consumes the treat.

The present invention provides a weighted chew article support for a pet to gnaw or consume the article while being prevented from relocating the article during the activity. The device comprises a weighted bag having a strap connector along its upper surface for securing to the chew article, or optionally connecting to a harness that supports a plurality of chew articles for multiple pet use. It is submitted that the present invention substantially diverges in design elements from the prior art, and consequently it is clear that there is a need in the art for an improvement to existing devices. In this regard the instant invention substantially fulfills these needs.

SUMMARY OF THE INVENTION

In view of the foregoing disadvantages inherent in the known types of weighted pet article supports now present in the prior art, the present invention provides a new pet chew article support that can be utilized for providing convenience for the user when securing at least one pet chew article in place while the pet engages and chews the article.

It is therefore an object of the present invention to provide a new and improved weighted chew article support device that has all of the advantages of the prior art and none of the disadvantages.

It is another object of the present invention to provide a weighted chew article support device that comprises a resilient and weighted structure supporting a pet chew toy or pet treat along its upper portion, whereby a pet can consume or gnaw on the article within a given area, while the weight resists the pet moving the article from a location chosen by an owner.

Another object of the present invention is to provide a weighted chew article support device that utilizes a strap securement for the pet treat and a means to prevent sliding of the pet treat while grasped by the strap securement, supporting the treat in an open and accessible manner while preventing the pet from removing the treat from the strap securement.

Yet another object of the present invention is to provide a weighted chew article support device that comprises a weighted, repairable and resilient sack of dense material to position a pet treat or chew toy in a static and accessible position, while also providing a lowermost surface that prevents sliding of the assembly along smooth surfaces.

Another object of the present invention is to provide a weighted chew article support device that provides a multiple chew article support device, whereby more than one chew article is supported and secured to the weighted support for enjoyment by more than one pet at a time.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
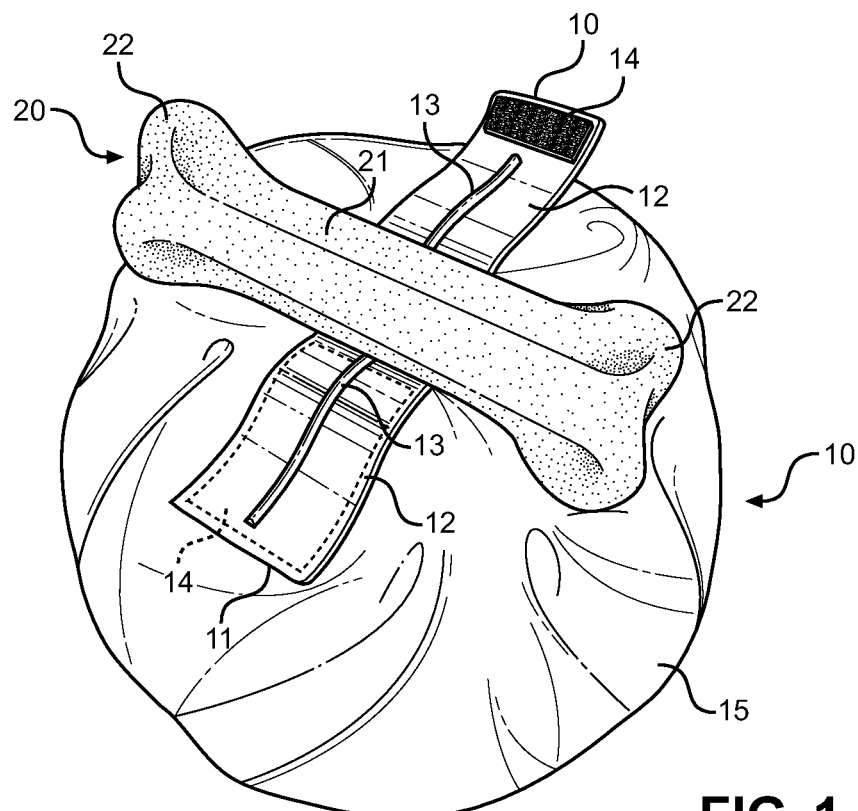
FIG. 1 shows an overhead perspective view of the present invention attaching to a pet chew article, whereby its strap attachment means is in an open position.

Reference is made herein to the attached drawings. Like reference numerals are used throughout the drawings to depict like or similar elements of the pet chew article support device. For the purposes of presenting a brief and clear description of the present invention, the preferred embodiment will be discussed as used for supporting at least one chew article for a pet to gnaw or consume, while preventing the pet from relocating the assembly during deployment. The figures are intended for representative purposes only and should not be considered to be limiting in any respect.

Referring now to FIG. 1, there is shown a perspective view of the pet chew article support of the present invention being deployed in conjunction with a dog bone 20 pet chew article. The article support comprises a weighted and compressible sack 10 having an outer sidewall 15 and an internal volume filled with a dense material that weighs down the assembly and prevents a pet from moving the assembly once positioned on a surface. Ideally the internal material is a granular material such as sand, which allows for compression of the sack. Alternatively, the dense material may be a combination of granular material and an internal weight that is positioned within the granular medium. Finally, it is contemplated that a solid material may fill the interior volume of the same to provide the necessary weight for support of the pet chew article. The support secures to a pet treat or chew toy article 20 and prevents the pet from readily picking up the article 20 and relocating it within the house or outside of a residence. In this way, a pet and its chew article can be readily located, while its position can be controlled while the pet engages a chew article. This provides pet owners with a convenient way to monitor a pet in one location while eating, preventing the pet from hiding partially consumed articles, and further for providing a means to locate the pet within a given area for unmonitored occupation of the pet's attention.

Along the upper portion of the weighted article is a pet article strap attachment means comprising a first and second elongated strap 12. Each strap secures at one end to the upper portion of the weighted sack 10, while the strap second end 11 is meant to overlap the body section 21 a pet treat article 20. The straps 12 overlap one another and secure over the chew article 20, whereby the two straps secure to one another using a strap connector elements to prevent separation. The connector elements are preferably hook and loop fastener strips 14 that secure each strap to one another for removable connection therebetween. Along the interior surface of each strap 12 is a length of elastomeric, tacky, or silicon strip 13, which prevents the body 21 of the chew article 20 from sliding within the enclosed straps, and further prevents the pet from pulling the article 20 through the straps 12 by its ends 22. When secured, the pet chew article 20 is also largely exposed, whereby its ends 22 can be chewed, gnawed, or consumed by the pet while the assembly remains in position and the weighted support prevents ready relocation of the chew article 20. Preventing the pet from pulling the article 20 through the straps 12 is of primary importance for the overall effectiveness of the assembly. The large exposed regions of the chew article 20 allow easy purchase by the pet within its mouth, therefore the use of the interior strip 13 is imperative to counteract any pulling force along the length of the chew article body 21

Figure 2:
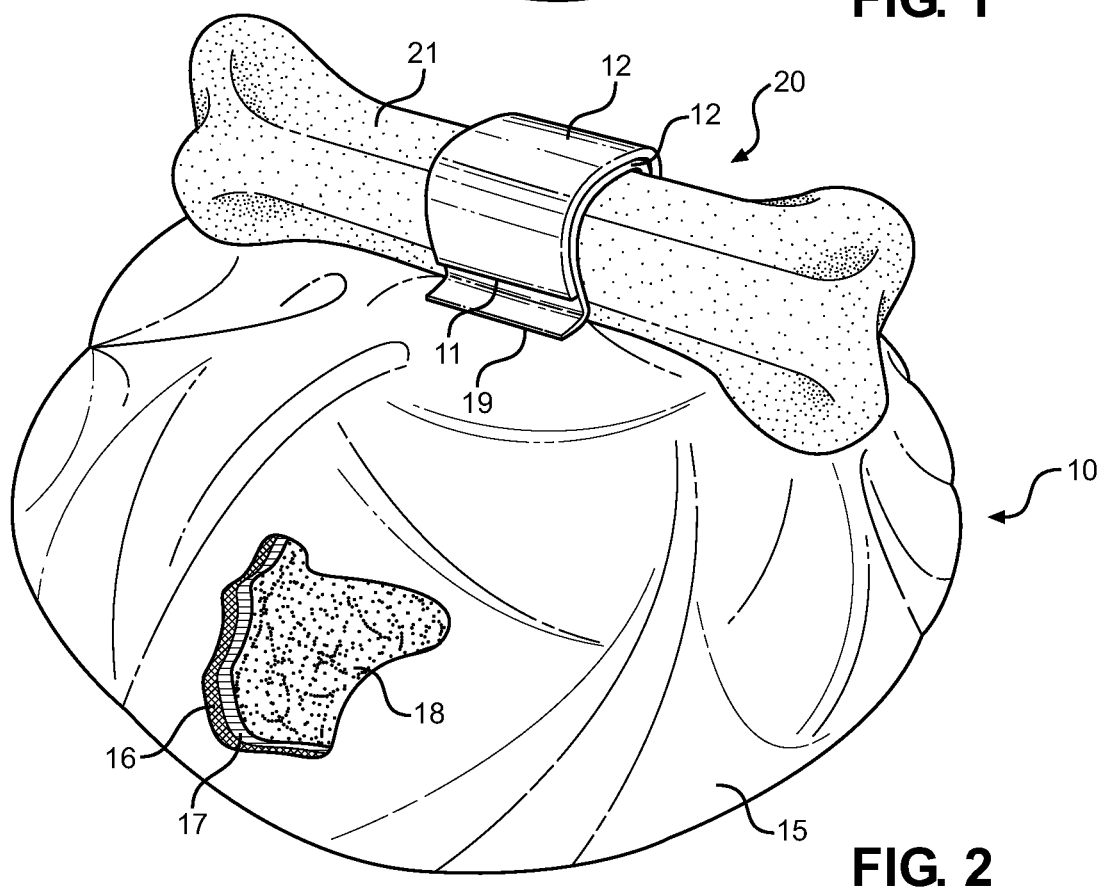
FIG. 2 shows a perspective side view of the present invention in a working state along with a cut-away view of the cross section of the support device.

Referring now to FIG. 2, there is shown a second perspective view of the present invention, this time in a working state and with a cut-away view of the structure of the weighted sack 10. When deployed, the straps 12 provide a means to secure a chew toy or treat 20 to the weighted structure of the device, whereby a pet can freely chew and consume the article 20 without causing damage to the structure sidewalls 12. The sidewalls 12 are preferably comprised of a toughened, weather-proof fabric material layer 16 having an interior moisture barrier layer 17 thereunder. The fabric material is one that can be chewed upon without readily being compromised, while after a deployed period, the fabric can be patched or sewn together if holes are created. The moisture barrier 17 prevents moisture and pet saliva from entering into the interior of the sack and coagulating or clumping the fill material.

Within the interior of the sidewalls 12 is a high density material 18 that fills the open interior of the sack 10 and provides the structure with its weight and sidewalls stiffness. This fill material is preferably a sand or similar granular material, while the sack interior volume is filled to an extent that the walls 12 are not overly tensioned so as to prevent a structure that can rupture if the pet clinches the sidewalls 12 of the sack. At the same time, the fill material 18 must consume a sufficient amount of the interior volume of the sack to weigh down the chew article 20 and prevent the sidewalls 12 from folding onto themselves. This condition makes it too easy for a pet to obtain purchase of the sidewalls with their jaws and relocate the assembly. When deployed, the weight of the sack 10 prevents relocating of the chew article 20, while the straps 12 secure the chew article body 21 to their first end connection 19 along the upper portion of the weighted sack.

Figure 3:
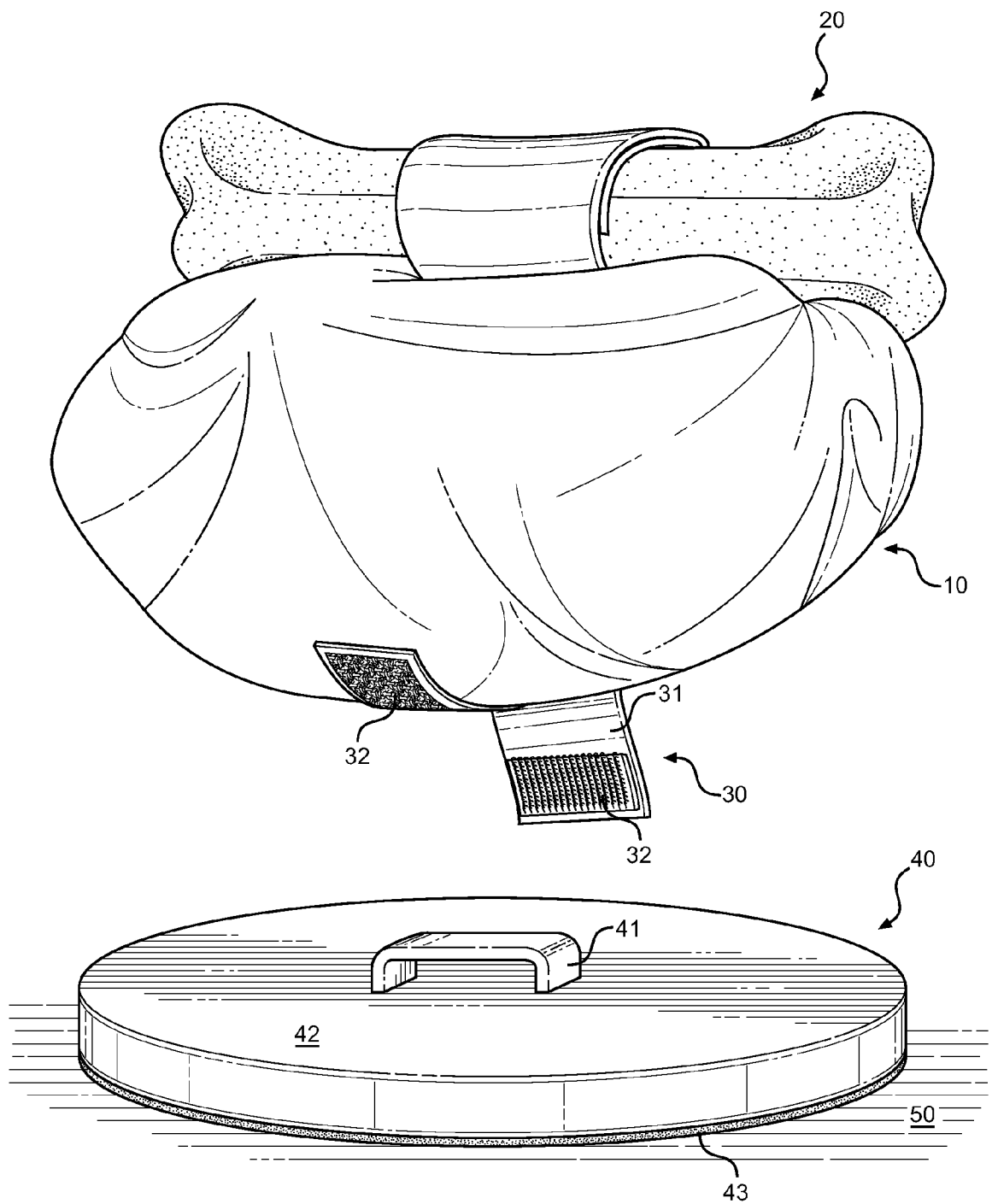
FIG. 3 shows an exploded view of an embodiment of present invention connecting to a weighted and non-slip base surface.

Referring now to FIG. 3, there is shown an exploded view of an embodiment of the present invention that includes a non-slip base 40. The base 40 is one that prevents the weighted sack 10 from sliding along smooth surfaces 50, such as linoleum, tile, and hardwood flooring while a pet engages a chew article 20 attached thereto. The base 40 connects to the underside of the weighted sack 10 by way of a permanent (sewn) connection, or preferably using a removable strap connection (shown in FIG. 3). The base 40 itself may be a thin, non-slip structure having a high friction underside surface 43, or alternatively the base may be comprised of a weighted structure itself having a thickness and a non-slip underside surface 43. The weighted base 40 embodiment adds to the overall weight of the assembly, furthering the goal of retaining the chew article 20 location once thereattached.

In a preferred embodiment, the base is optional and removably attachable to lower portion of the weighted sack 10. In one embodiment, a lowermost strap 31 secures through a loop or bridge element 41 along the upper surface 42 of the base 40. The strap 31 includes a strip of hook and loop fastening material that mates to a complimentary strip 32 along the lower portion of the sack 10. This strap connection means 30 provides a removable connection with the base, allowing the fabric sack 10 to be removed therefrom if the user wishes to wash or repair the fabric sack 10 independently of the base 40.

Figure 4:
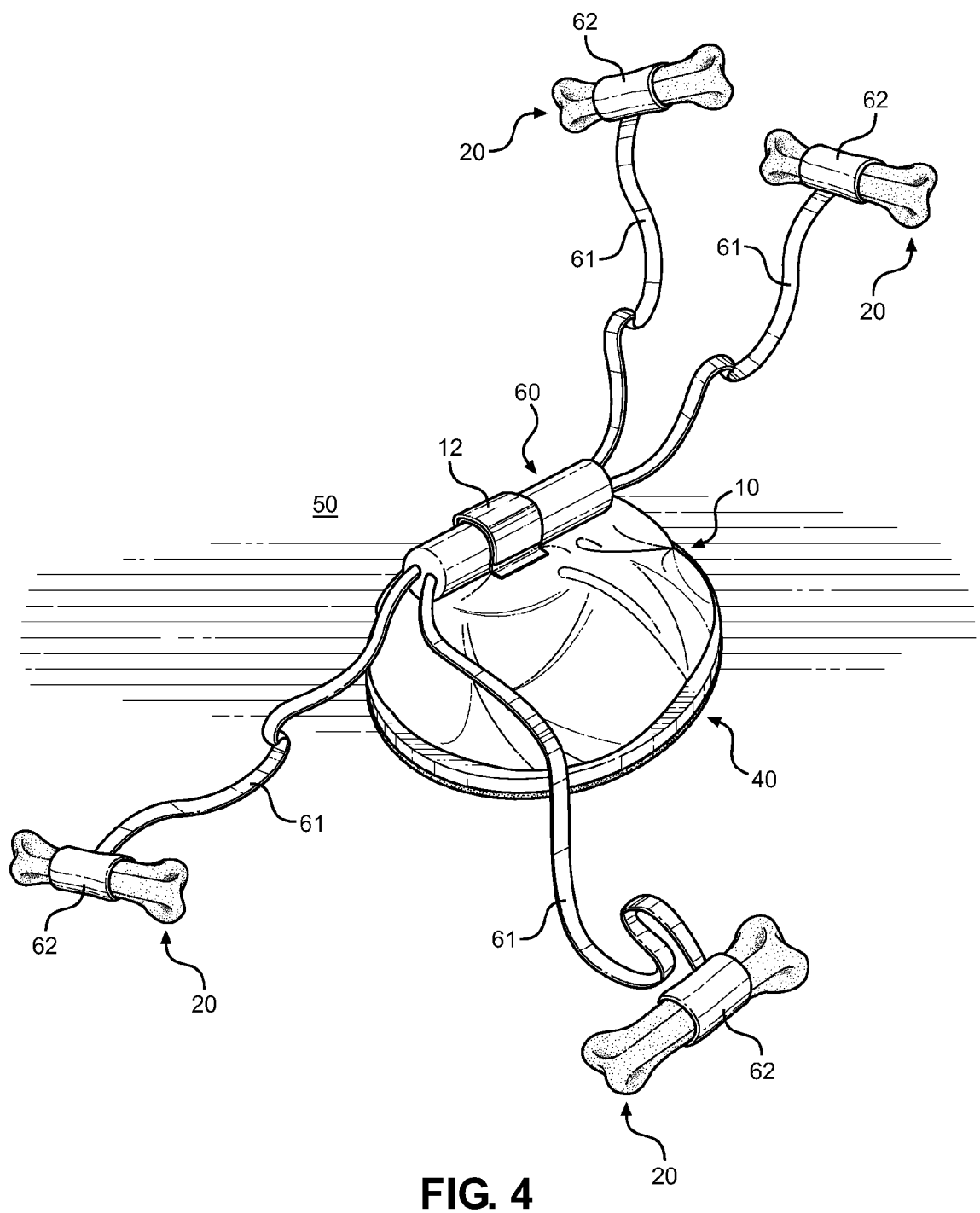
FIG. 4 shows a perspective view of an embodiment of the present invention, wherein a multi-chew article support means is provided.

Referring now to FIG. 4, there is shown an overhead perspective view of an alternate embodiment of the pet chew article support of the present invention. In this embodiment, the chew article strap securement 12 supports a multi-chew article support device about its base 60. Extending from the base 60 while secured by the straps 12 of the weighted sack 10 are a plurality of elongated tethers 61 that extend away from the sack 10 and provide their own, independent chew article strap connector element 62. In this way, the distal ends of each tether 61 attached to a chew article 20 and allow multiple pets to engage a chew article of their own in one centralized location. The weight of the sack 10 prevents the pets from relocating the entire assembly, while the optional base 40 can further prevent sliding along slick surfaces 50. It is contemplated that many tethers may be deployed, whereby each tether 61 is secured to the base element 60 that is secured within the strap connector of the weighted sack 10. The base element 60 is preferably an elongated structure that the straps 12 can encircle and secure therearound.

In an alternate embodiment of the multiple pet chew article support and the present invention, the tethers 61 may originate directly from the upper portion of the weighted sack 10, as opposed to being supported by the chew article straps 12. This embodiment is adapted for multiple pet use, and is only a contemplated variation of the preferred layout, wherein the multi-article support is removable connected to the sack 10 and is an accessory thereto.

When pet owners give their pets a chew article such as a bone or chew toy, they have to supervise the pet to make sure the pet doesn't choke. This can be an unwanted task for the owner, as many pets like to run away with the article and enjoy it or hide it elsewhere. This can create a mess both inside and outside of the home, where partially consumed or lost chew articles can attract pests, become rotten, or simply clutter interior and exterior spaces. As an alternative to allowing the pet to freely obtain and run away with the chew article, owners can attempt to hold the bone or chew toy with one end and let the pet chew on the other end. However, this arrangement poses a risk of being accidentally bitten, as some pets are more aggressive than others and may not understand. Further still, this does not solve the problem of providing a chew toy that can occupy the pet by itself and relief the owner of supervisory duties.

The present invention attempts to solve this known problem and provide a solution that offers owners flexibility, while also offering a product that is of low cost and low complexity. The device provides pet owners with a convenient way to hold pet chew articles for their pets and to prevent the articles from being repositioned or lost while the pet is engaging the article. The device comprises a sack filled with dense material, whereby the chew article is securely fastened thereto. Embodiments herein disclosed include a means to prevent the device from sliding along support surfaces and a means for supporting a plurality of extended chew articles in connection with the weighted sack, along with the chosen fill material to provide weight to the assembly. Pet owners can easily keep an eye on their pets while the pets are chewing on the articles, making sure the dogs don't choke or hurt themselves. Further still, owners can place a chew article in a desired location to occupy a pet for a given amount of time, relieving the owner of any duties to supervise or locate the pet or its chew article.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A weighted pet chew article support device, comprising:
   a sack having an outer sidewall, an internal volume, an upper portion, and a lower portion;
   said sack interior volume being filled with a dense material to provide weight;
   said sack upper portion comprising a pet chew article strap connection means, comprising a first and second strap secured to said sack upper portion and having connector elements to removably secure said straps together around a pet chew article;
   at least one of said straps having an interior surface further comprising an elongated elastomeric strip, said strip for contacting said pet chew article and counteracting sliding motion thereof.

2. The device of claim 1, wherein said sack sidewall comprises an outer fabric layer and an interior moisture barrier.

3. The device of claim 1, further comprising a base attached to said sack lower portion, said base having a non-slip underside surface to prevent sliding along a support surface.

4. The device of claim 3, wherein said base comprises a weighted structure having a thickness and a weight that adds to said sack weight for supporting said pet chew article.

5. The device of claim 3, wherein said base attachment to said sack is a removable connection.

6. The device of claim 5, wherein said removable connection further comprises:
   an elongated strap having a first end attached to said sack lower portion and a second end removably attached to said sack lower portion using a strap connector element;
   said base having an upper surface comprising a loop element for said strap to secure therethrough.

7. The device of claim 1, further comprising:
   a multiple pet chew article support means comprising a base element, a plurality of elongated tethers extending from said base element, and pet chew article strap connectors at said tether ends for securing a pet chew articles thereto;
   said base element adapted to be secured by said sack upper portion strap connection means.

8. The device of claim 1, wherein said dense material within said interior volume comprises a granular material.

9. The device of claim 8, wherein said pet chew article strap connectors further comprise:
   an interior surface further comprising an elongated elastomeric strip, said strip contacting said pet chew article and counteracting sliding motion thereof.

10. The device of claim 1, wherein said dense material within said interior volume comprises a solid material.

11. A weighted pet chew article support device, comprising:
    a sack having an outer sidewall, an internal volume, an upper portion, and a lower portion;
    said sack interior volume being filled with a dense, granular material to provide weight;
    a multiple pet chew article support means extending from said sack upper portion;
    said multiple pet chew article support means comprising a plurality of elongated tethers extending from said base element, and pet chew article strap connectors at said tether ends for securing a pet chew article thereto.

12. The device of claim 11, wherein said pet chew article strap connectors further comprise:
    an interior surface further comprising an elongated elastomeric strip, said strip contacting said pet chew article and counteracting sliding motion thereof.

13. The device of claim 11, wherein said sack sidewall comprises an outer fabric layer and an interior moisture barrier.

14. The device of claim 11, further comprising a base attached to said sack lower portion, said base having a non-slip underside surface to prevent sliding along a support surface.

15. The device of claim 14, wherein said base comprises a weighted structure having a thickness and a weight that adds to said sack weight for supporting said pet chew article.

16. The device of claim 14, wherein said base attachment to said sack is a removable connection.

17. The device of claim 16, wherein said removable connection further comprises:
    an elongated strap having a first end attached to said sack lower portion and a second end removably attached to said sack lower portion using a strap connector element;
    said base having an upper surface comprising a loop element for said strap to secure therethrough.

* * * * *